| (12) | United States Patent<br>Fallshaw et al. | (10) Patent No.: US 8,205,297 B2<br>(45) Date of Patent: Jun. 26, 2012 |
|---|---|---|

(54) SWIVEL CASTOR BRAKING SYSTEM

(75) Inventors: Andrew Fallshaw, Bellbrae (AU);
 Andrew Charles Crawford, West
 Melbourne (AU); **Mathew Keith
 Trainor, West Melbourne (AU); Brent
 Matthew Strahan**, Sunshine (AU);
 Kenneth Harrison, Sunshine (AU)

(73) Assignee: Fallshaw Holdings Pty Ltd, Sunshine,
 VIC (AU)

( * ) Notice: Subject to any disclaimer, the term of this
 patent is extended or adjusted under 35
 U.S.C. 154(b) by 0 days.

(21) Appl. No.: 12/663,354

(22) PCT Filed: Jun. 6, 2008

(86) PCT No.: PCT/AU2008/000818
 § 371 (c)(1),
 (2), (4) Date: Dec. 7, 2009

(87) PCT Pub. No.: WO2008/148169
 PCT Pub. Date: Dec. 11, 2008

(65) Prior Publication Data
 US 2010/0175222 A1 Jul. 15, 2010

(30) Foreign Application Priority Data

Jun. 6, 2007 (AU) .................. 2007903047

(51) Int. Cl.
 *B60B 33/00* (2006.01)
(52) U.S. Cl. ......................................... 16/35 R
(58) Field of Classification Search .................. 16/35 R,
 16/35 D, 18 R; 188/72.9, 1.12
 See application file for complete search history.

(56) References Cited

U.S. PATENT DOCUMENTS 3,911,525 A * 10/1975 Haussels .................. 16/35 R
3,988,800 A * 11/1976 Sachser .................... 16/35 R
4,349,937 A 9/1982 Fontana
(Continued)

FOREIGN PATENT DOCUMENTS

CA 1271143 A1 7/1990
(Continued)

OTHER PUBLICATIONS

International Search Report and Written Opinion of Counterpart Application No. PCT/AU2008/000818 Filed on Jun. 6, 2008.

*Primary Examiner* — Victor Batson
*Assistant Examiner* — Matthew Sullivan
(74) *Attorney, Agent, or Firm* — David D. Brush; Westman, Champlin & Kelly, P.A.

(57) ABSTRACT

A swivel castor assembly, includes a body having at least one rotatable wheel engageable with a floor or ground surface below the body, a brake actuable to brake or prevent rotation of the wheel, and an element for mounting the body such that it is able to swivel about a generally upright axis. A head is adapted to be mounted to prevent or restrict its rotation about the upright axis. A brake activator is mounted to the head for movement between a braking position in which it activates the brake, a neutral position in which the brake is inactive and the body is not prevented from swivelling about the upright axis, and a direction-lock position in which the body may be swivelled to one of plural selectable orientations with respect to the head at each of which the body is locked against swivelling but the brake is inactive.

38 Claims, 5 Drawing Sheets

U.S. PATENT DOCUMENTS

| | | | |
|---|---|---|---|
| 4,658,466 A | | 4/1987 | Vollberg et al. |
| 4,788,741 A | | 12/1988 | Hilborn |
| 4,815,161 A | * | 3/1989 | Timmer et al. ............... 16/35 R |
| RE34,433 E | * | 11/1993 | Heiligenthal et al. ........ 16/35 R |
| 5,774,936 A | * | 7/1998 | Vetter ........................... 16/35 R |
| 6,062,577 A | | 5/2000 | Tan |
| 6,125,972 A | * | 10/2000 | French et al. ................ 188/1.12 |
| 6,353,948 B1 | * | 3/2002 | Bolden et al. ..................... 5/600 |
| 6,584,641 B1 | * | 7/2003 | Milbredt ....................... 16/35 R |
| 7,134,167 B2 | * | 11/2006 | Yan .................................... 16/39 |

FOREIGN PATENT DOCUMENTS

| | | | |
|---|---|---|---|
| EP | 1527906 A2 | | 5/2005 |
| FR | 2700991 A1 | | 2/1993 |
| GB | 1168319 A4 | | 10/1969 |
| GB | 2033742 A | | 5/1980 |
| GB | 2055041 A | | 2/1981 |
| GB | 2160415 A | | 6/1984 |
| GB | 2179848 A | | 3/1987 |
| GB | 2441303 A | | 3/2008 |
| JP | 05310005 A | * | 11/1993 |

* cited by examiner

SWIVEL CASTOR BRAKING SYSTEM

FIELD OF THE INVENTION

The present invention relates to swivel castors having braking systems. Such swivel castors are employed in a wide variety of applications, including trolleys, hospital beds and a range of mobile industrial and commercial equipment.

BACKGROUND OF THE INVENTION

For many years swivel castors with braking systems have been constructed such that the brake pedal is attached to the swivelling fork or frame element of the castor. When these castors are mounted to the bottom of a piece of equipment or furniture, such as an equipment trolley, the brake pedal rotates with the castor and in particular positions the brake pedal is orientated such that access is restricted by the trolley. If four swivel castors are attached to the base of the equipment trolley at its corners, and the trolley is pushed from one side, all four castors swivel to align themselves with the direction of travel. This will position two of the brake pedals underneath the trolley, making them difficult to access to activate the respective brakes.

It is therefore an object of the present invention to provide an improved castor assembly, in which this disadvantage of present castor assemblies is addressed.

SUMMARY OF THE INVENTION

The invention provides a swivel castor assembly, including:
  a body having at least one rotatable wheel engageable with a floor or ground surface below the body, a brake actuable to brake or prevent rotation of said wheel, and means for mounting the body such that it is able to swivel about a generally upright axis;
  a head adapted to be mounted to prevent or restrict its rotation about said upright axis; and
  a brake activator mounted to the head for movement between a braking position in which it activates said brake, a neutral position in which said brake is inactive and said body is not prevented from swivelling about said axis, and a direction-lock position in which the body may be swivelled to one of plural selectable orientations with respect to the head at each of which the body is locked against said swivelling but the brake is inactive.

Preferably, in the braking position the body is prevented from swivelling about said axis.

In an embodiment, the brake activator may project from the body and/or head, and may be foot-engageable. In the latter case, the brake activator is preferably mounted to the head for pivotal movement between its respective positions about a generally horizontal axis. Typically, movement to the braking position may be by foot depression of the brake activator, and movement to the direction-lock position may be by lifting of the brake activator.

Said means for mounting the body such that it is able to swivel about a generally upright axis may typically include a cavity to receive a pintle, and optionally the pintle itself, the cavity and pintle defining the upright swivel axis. The head is preferably adapted such that it is prevented from rotating relative to the trolley. The top section of the pintle, where it is fitted to the trolley, may take the form of a simple threaded rod for screwing directly into the trolley, a horizontal plate with provision for mounting bolts, a solid thick stem with horizontal threaded holes for accepting affixing screws or other standard castor fitment methods.

The assembly preferably further includes a slidable coupling member responsive to, and preferably cooperable with, said brake activator to slidably move between three positions, respectively corresponding to said braking position, said neutral position and said direction-lock position, in which the slide member respectively actuates said brake, is keyed to said head without actuating the brake or preventing swivelling of the body, and irrotationally couples said body to said head at one of said plural selectable orientations.

Preferably, said keying of the slidable coupling member to the head arises from engagement between complementary formations on said coupling member and on said head. Said coupling of the body to the head may include engagement between cooperating formations, e.g. square male and female formations that define interengageable orientations corresponding to said selectable orientations of the brake activator.

Advantageously, said member that in turn define selectable sets of orientations of the co-operating formations and thereby of said body.

The brake may include a plunger depressed by said slide member, a rocker in turn pivoted by the plunger, and a brake element engageable with the wheel.

The brake activator is preferably generally u-shaped and embraces the head, and has a foot engageable web on a projecting portion.

Advantageously, there will typically be a pair of wheels, one to either side of the body.

BRIEF DESCRIPTION OF THE DRAWINGS

The invention will now be further described, by way of example only, with reference to the accompanying drawings, in which:

FIG. 3 is a fragmentary view of the head and pintle components, also depicting one arrangement by which the castor assembly can be fitted to a trolley or the like;

DESCRIPTION OF EMBODIMENTS OF THE INVENTION

The illustrated swivel castor assembly 10 includes a main body 20 that journals a pair of rotatable wheels 30,32 engageable with a floor or ground surface below the body, and is in two principal parts: a bi-flanged disc portion 21 between the wheels that is truncated at its base to clear the underlying floor or ground surface, and a broader upstanding portion 19, of generally annular cross-section at its upper end, projecting eccentrically from the disc portion.

Upstanding portion 19 defines a blind cavity 22 to rotatably receive a pintle 25 so that body 20 is able to swivel about the pintle, and therefore about a generally upright axis 8. Cavity 22 carries a ball 23 at its inner end that is part of a bearing arrangement between the pintle and body 20. A clip 23 at the base of the pintle 25 is pushed down over small protrusions in the castor body's pintle hole 22. This prevents the pintle from falling out of the castor when it is lifted up.

Figure 5:
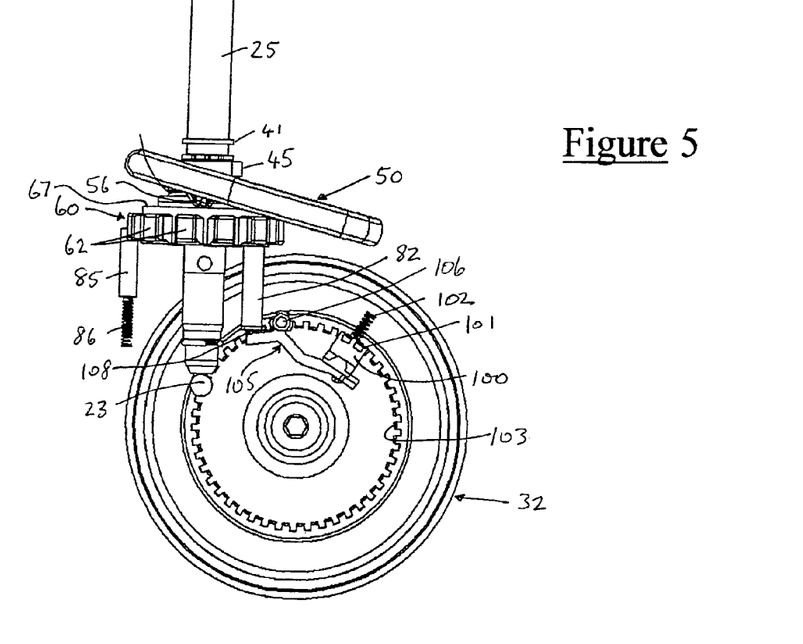
FIG. 5 is a schematic view corresponding to FIG. 2 depicting primarily operational components, and with the brake activator in its depressed, or braking, position.

Projecting body portion 19 has an outer housing that is cylindrical adjacent its upper end, where it terminates at a rim 26 that seats a head 40 in the form of an inverted cap. Head 40 encloses an annular chamber 42 extending below rim 26. At the centre of this chamber, an upstanding annular post 44 of body 20 terminates in an end formation 45 of square profile (FIG. 5) on which is fixed a locking ring 46 by which the body 20 is retained in place on the pintle.

Head 40 is in turn fitted to pintle 25, e.g. by a close fit at a central aperture 25*a*, so as to allow the pintle 25 to rotate about axis 8 as a means of mounting the castor by screwing the threaded section of pintle 25 in the trolley fitment while providing for axial 8 alignment of the head 40.

Figure 3:
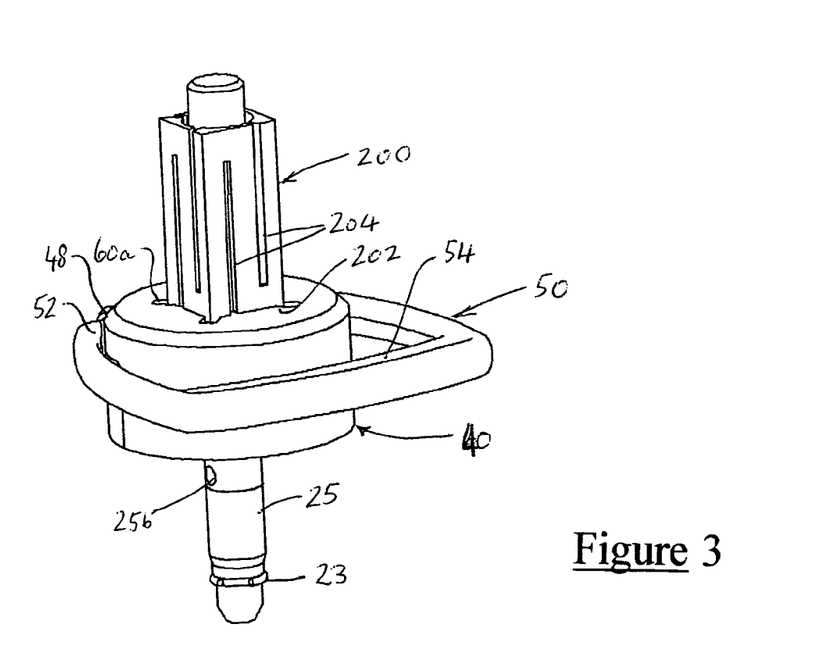
Figure 4:
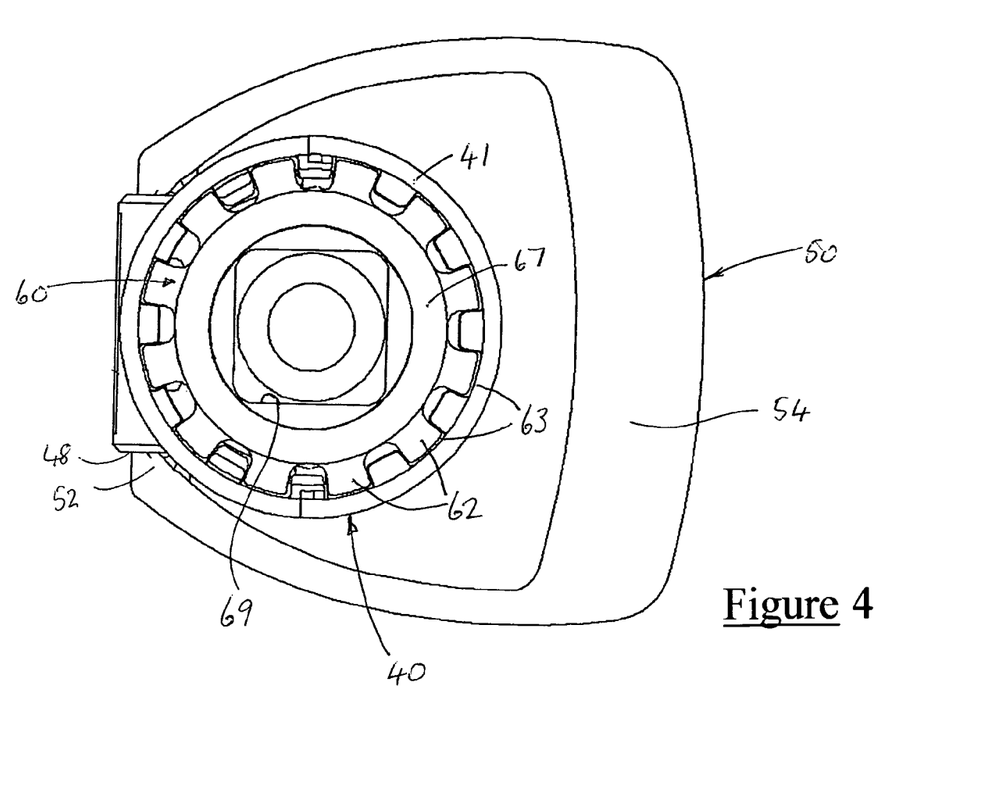
FIG. 4 is a panel cross-section on the line 4-4 in FIG. 2.

In situ, pintle 25 is irrotationally mounted at its top end in a suitable fitting of a trolley or other item being supported by the castor assembly. One exemplary arrangement for effecting this is depicted in FIG. 3, utilising a laterally expandable clamp fitting 200 of initial square cross-section that seats in a matching square tube of a trolley. (Similar round components are available for round-tube trolleys). Fitting 200 has depending lugs 202 at its bottom corners that match up with respective radial slots 60*a* in head 40. By virtue of its interlaced longitudinal slits 204, square fitting 200 expands and is clamped in its mounting tube when rotation of pintle 25, which is threaded in this case, draws a wedge-shaped adaptor (not visible) downwards. With lugs 202 engaged in slots 60*a*, and the square-section fitting clamped in a square tube, directivity is determined and maintained between head 60 and the trolley.

The head 40 is located vertically from above by an annular flange on pintle 25 and from underneath by a circlip 41 which is fitted to a slot in pintle 25. There is a horizontal hole (not visible) in the body 20 which aligns with a hole 25*b* (FIG. 3) in the pintle 25. The assembly 10 is mounted by inserting a metal lever or similar through both holes and turning the pintle 25 from within the assembly to, for example, expand fitting 200 seen in FIG. 3 as earlier described.

It can be seen that the because the pintle 25 rotates within the head 40 as the assembly 10 is mounted to the trolley the assembly 10 can be oriented at any angle. Means for orienting or preventing the assembly 10 from rotating in either of the two swivel-lock modes is provided by one of two methods: the first of which is simply where sufficient torque is applied to the pintle 25 such that there is enough clamping force between the head 40 and the trolley to prevent rotation; in the second method the trolley itself is built so that it has small protruding lugs which engage into radially aligned slots 60*a* in the top surface of the head 40.

Figure 1:
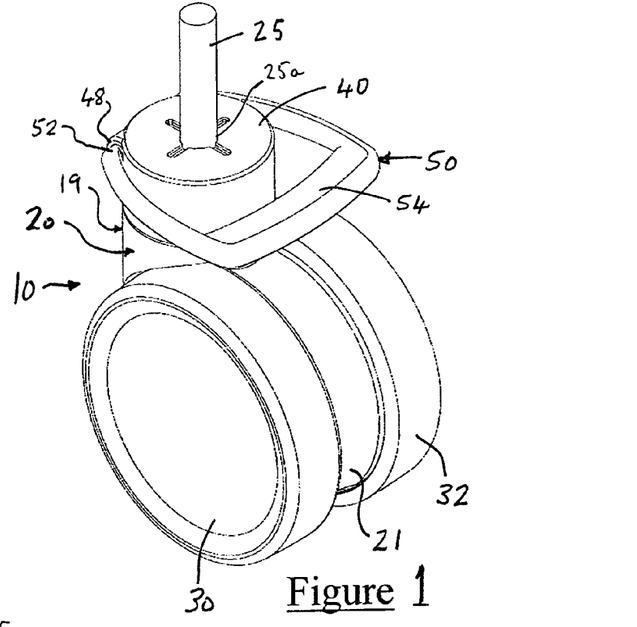
FIG. 1 is a front perspective view of a swivel castor assembly according to a first embodiment of the invention.
Figure 2:
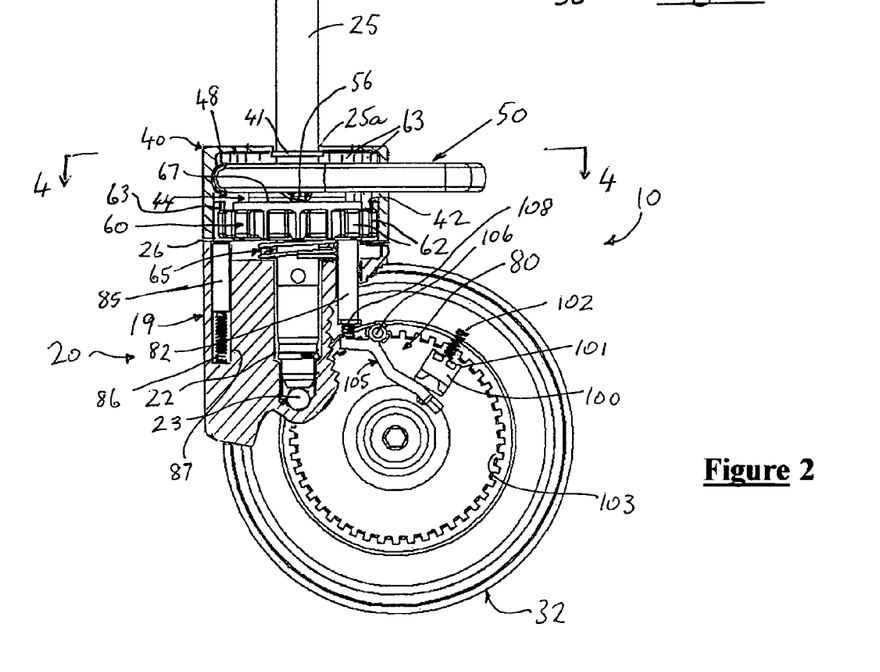
FIG. 2 is a partly sectioned, partly cut-away side view of the castor assembly depicted in FIG. 1, with the brake activator in its neutral position.
Figure 6:
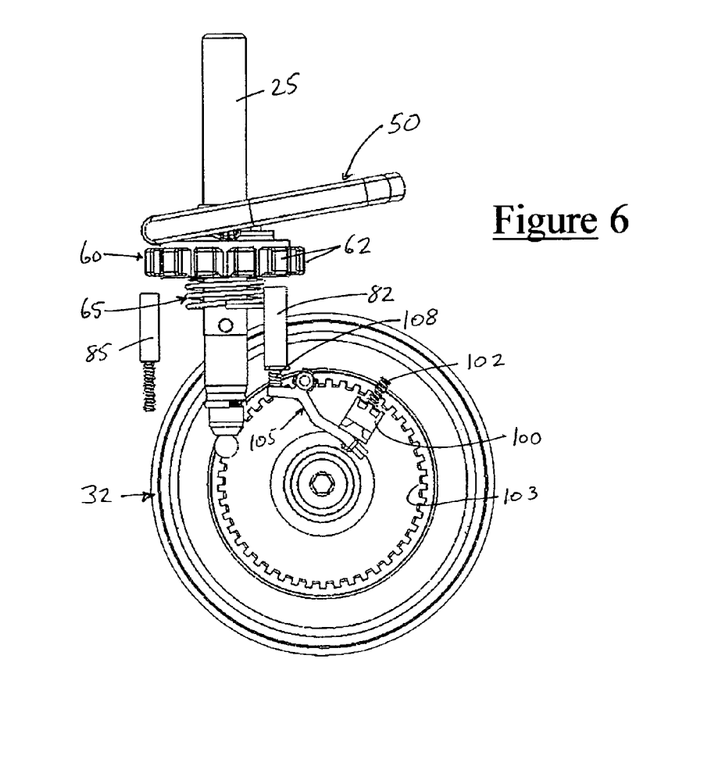
FIG. 6 is a view similar to FIG. 5, with the brake actuator in its locked position.
Figure 7:
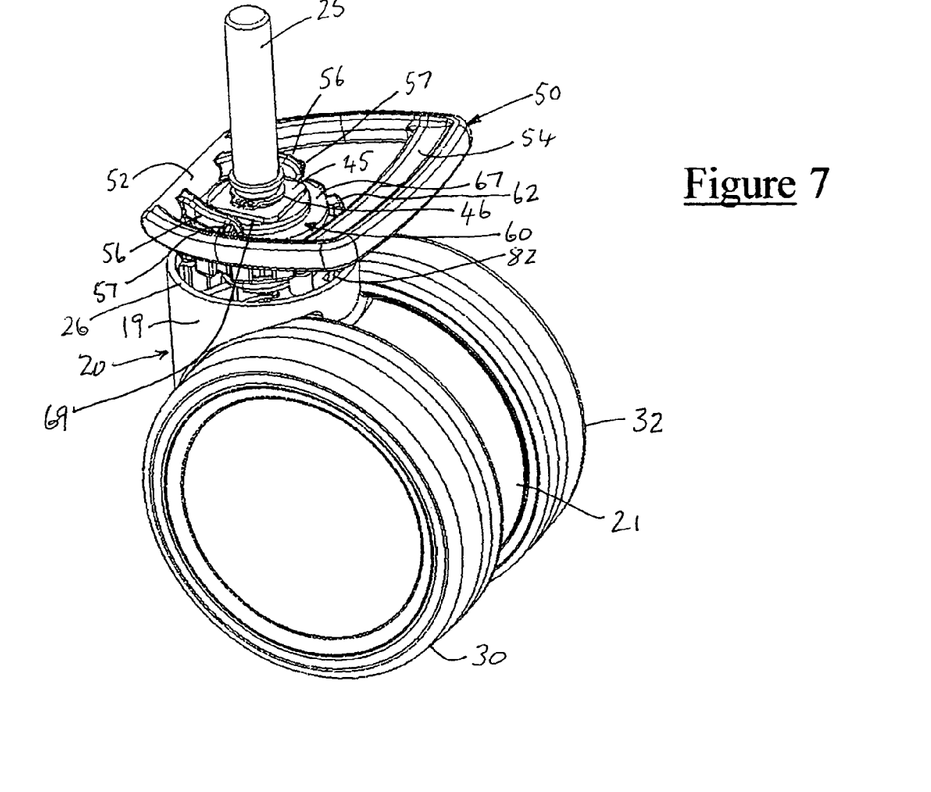
FIG. 7 is a perspective view corresponding to FIG. 6, with parts omitted for clarity of view.
Figure 8:
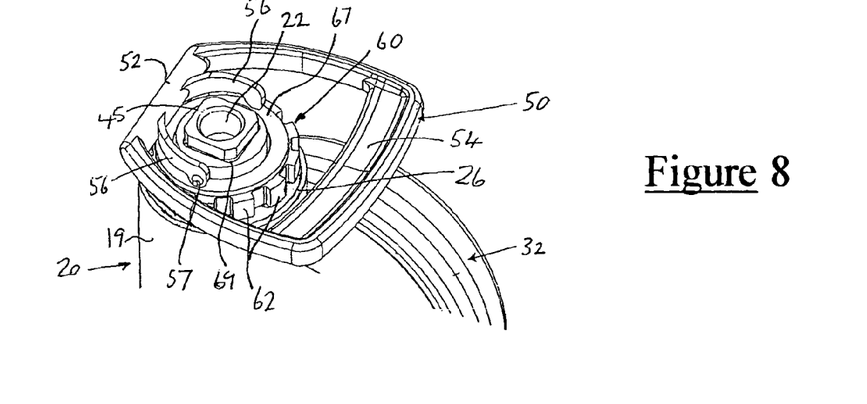
FIG. 8 is a fragmentary view similar to part of FIG. 7, but depicting the neutral position.

Interacting within chamber 42 are an external foot engageable brake activator 50 and an internal annular slide member 60. Brake activator 50 is in the shape of a generally u-shaped element projecting from an integral axle cross-piece 52 at its rear that is journaled in a pair of aligned side openings 48 at the rear of head 40, for rotation about a horizontal axis. At its front, brake activator 50 has a transverse foot-engageable web 54 by which it can be operated as a pedal, and thereby depressed from a neutral position, in which the activator extends horizontally (FIG. 2) to a braking position (FIG. 5), or lifted to a direction-lock position (FIGS. 6 and 7).

Figure 9:
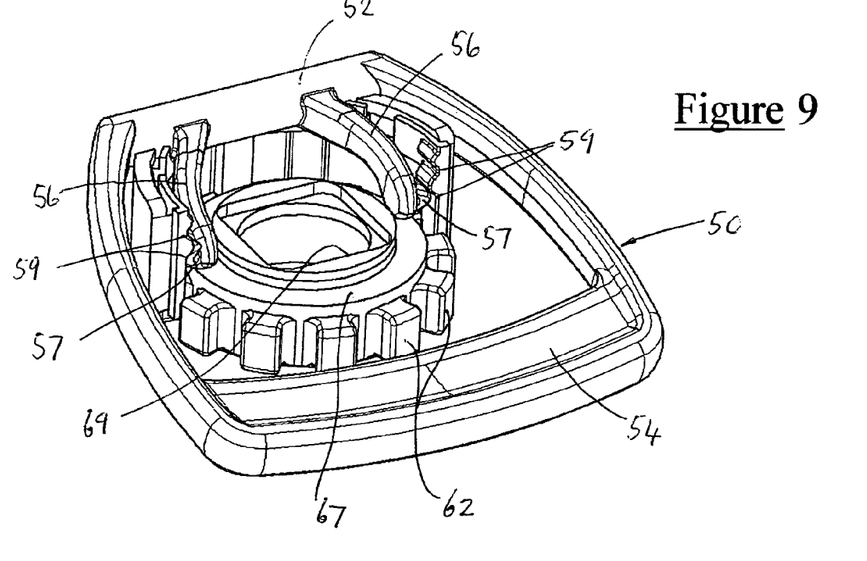
FIG. 9 is another fragmentary view that shows the brake activator and the slide member, and their interaction.

Slide member 60 has an internal axial bore by which it is slidable on post 44, but it is not rotatable by virtue of engagement between multiple dovetail teeth 62 at its periphery and complementary integral keyways 63 on the inside surface of the cylindrical wall 41 of head 40. Slide member 60 also has an upper square female formation in the form of recess 69 (best seen in FIG. 9) that can receive male square formation 45 in a close sliding fit.

Inside head 40, axle cross-piece 52 of brake activator 50 carries a pair of short, downwardly inclined, cantilevered arms 56 that extend to either side of post 44 to rest on an upper annular surface 67 of slide member 60. The angles are chosen such that, by this arrangement, up and down hinging movement of activator 50 between its three operative positions is effective to cause corresponding sliding movement of slide member 60. Engagement of arms 56 and slide member 60 is maintained by a helical compression spring 65 that biases slide member 60 upwards. Arms 56 are of a length so that they interact with the middle of the sliding member—thus pushing it down without tilting it in its vertical motion, which might cause it to jam.

The three positions of brake activator 50 are indexed by engagement between nipples 57 on arms 56 and corresponding seating recesses 59 (FIG. 9) on the inside cylindrical surface of head 40. Sufficient force on the activator 50 releases the arms 56 from these recesses by deformation of the arms.

The details of the brake mechanism 80 will now be described. The brake mechanism 80 has a radially slidable toothed element 100 that extends through body portion 21 and, on either side, has a set of generally rectangular teeth 101 at its outer face that engage a complementary continuous train of teeth 103 on an inside annular shoulder of the respective wheel. Frictional engagement may be employed instead. Element 100 is biased radially inwardly by a centrally located spring 102 but pushed outwardly into its operative position by movement of one end of a rocker 105 hinged at 106. The other end of the rocker is coupled to the bottom end of a plunger 82 by a helical compression spring 108. Plunger 82 is positioned for axial depression by slide member 60 as it moves to its lowermost position. Depression of plunger 82 by movement of brake activator 50, and thereby slide member 60, to the braking position causes the corresponding end of rocker 105 to drop about pivot 106, driving the other end up to move element 100 to its operative position. This indirect arrangement employing a rocker and a pair of low force intervening springs means that very little force is required at brake activator 50 to firmly engage brake element 100. The brake system activates by energising springs which then 'click' into place, not by physically pressing down on the pedal to provide a traditional braking force.

It should also be noted that, with respect to the indexing engagement between nipples 57 on arms 56 and the recesses on head 40, there is sufficient outwards force in the arms resulting from tension within the material to prevent the force of the braking element activating springs from disengaging the brake activator from the selected braking position.

The assembly's functionality will now be described. In the central or neutral position of brake activator 50 depicted in FIG. 2, the wheels 30,32 are free to rotate, while body 20, and therefore the wheels, can freely swivel about pintle 25. In the braking position of FIG. 5, slide member 60 is pushed down below rim 26, triggering separate wheel-lock and swivel lock functions as follows. Firstly, the slide member 60 pushes plunger 82, which compresses spring 108. This spring pushes down on the rocker 105, which pushes the toothed element 100 radially outwards into the teeth 103 of the wheels 30,32. If the teeth 101 of the element 100 align with the teeth 103 of the wheels 30,32 then the plunger's spring 108 remains compressed. If the teeth 101 of the element 100 match up with the gaps between the wheel's teeth 103 (as would happen when the wheel is rotated slightly) then the plunger's spring is able to decompress and the teeth 101 of the element 100 are able to enter the wheel tooth train 103 and prevent it from rotating. This is the wheel-lock.

Secondly the slide member 60 comes into interaction with a pin 85 which sits on a spring 86 in a vertical blind bore 87 in body 20. If the teeth on the slide member 60 align with the top of the pin 85 then the pin's spring 86 is compressed. Otherwise, or if the body is rotated slightly, the spring 86 lifts the pin 85 so that it fits into the gaps between the teeth 62 of the slide member. Because the slide member is restrained to translate only vertically within head 40, the body 20 is prevented from swivelling around the head. This is the swivel-lock.

When the pedal is then lifted back towards the neutral position two other things happen.

Firstly the spring 65 biasing the slide member 60 upwards pushes back up to the neutral position. This releases the swivel-lock pin 85 from the slide member 60 and allows the body 20 to swivel freely once more. A slight lip on the head 40 prevents the pin 85 from rising any higher than it ought to, so that the swivel is not accidentally impeded if the pin were to become jammed in the sliding member. The pin 85 will be pushed out of the slide member as the latter rises back into the head 40.

The second thing that happens is that the plunger 82 is no longer pressed down. Spring 102 pushes the toothed element 100 radially inwards, out of engagement with the wheel. This disengagement then pushes the rocker 105 to rotate, which pushes the plunger 82 (and spring 86) back up to the original position.

In the elevated or direction-locked position depicted in FIGS. 6 and 7, when body 20 is swivelled to one of the four distinct orientations in which square recess 69 in slide member 60 and square formation 45 or post 44 are aligned, the elevated position of actuator 50 allows spring 65 to lift the slide member 60 to interengage the two square formations, thereby locking the body 20 in the selected swivel orientation. At this orientation, the wheels 30, 32 are free to rotate.

Alternatively, in the neutral position the brake activator can be swivelled to one of plural selectable orientations with respect to wheels 30,32 corresponding to the four distinct engagement orientations between square recess 69 and square head 45: when the selected position is reached, lifting of activator 50 allows spring 65 to lock home the selected position. The four selectable orientations are set to be aligned with and transverse to wheels 30,32. In this way, the orientation of the brake activator can be readily selected according to the intended movement of the trolley or the like on which the castor is mounted, and it can thereby be ensured that the brake activator will remain in a readily accessible outside position.

It will thus be appreciated that the illustrated castor assembly can be fixed into position on its trolley or other vehicle with the pedal of the brake activator projecting at the desired accessible position. The pedal can thereafter be operated from its neutral position to either its braking position, in which the wheels and the swivelling action are locked, or its direction-lock position at which the castor can be swung to one of the four selectable positions and locked at that position, while the wheels continue to run freely. The brake pedal itself remains rotationally fixed and accessible at the swivel-locked position.

It has been explained that alignment of the head 40 relative to the trolley is either achieved by the orienting slots in the head 40 engaging with protruding lugs in the trolley or by direct friction between the head 40 and the trolley. Now, it is a feature of slide member 60 that the multiple dovetail teeth 62 at its periphery are radially symmetric while the direction-locking recess 69 is square. If the slide member 60 is assembled into head 40 in a non-orthogonal orientation this will orient the square recess 69 at this new angle. This means when the direction-locking function is enabled the body 20 will now select a different set of positions relative to the head 40 orientation. This means that the assembly 10 is able to be configured such that the pedal can be positioned in multiple orientations relative to the trolley while still selecting the same four original directions.

Figure 10:
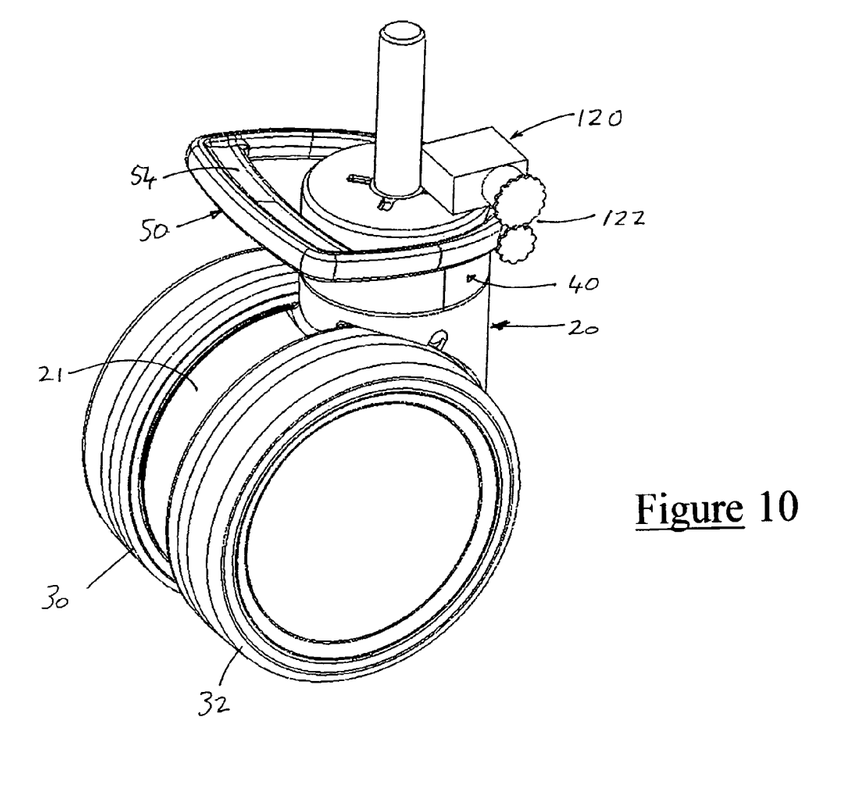
FIG. 10 is a front perspective view of a castor assembly according to a second embodiment of the invention in which the brake activator is electronically actuated.

Instead of foot (or manual) actuation of brake activator 50, means might be provided to provide an optional electronic brake activator. FIG. 10 depicts how this might be done while maintaining manual operation. A servo device 120 is mounted atop cap 40 and has a geared connection 122 to the axle cross-piece 52 of activator 50.

The invention claimed is:

1. A swivel castor assembly, including:
a body having at least one rotatable wheel engageable with a floor or ground surface below the body, a brake actuable to brake or prevent rotation of said wheel, and means for mounting the body such that it is able to swivel about a generally upright axis;
a head adapted to be mounted, to an item to be supported by the castor assembly, so as to prevent or restrict rotation of the head about said upright axis relative to said item;
a brake activator mounted to and projecting from the head and accessible as a pedal for foot engagement at the castor assembly at a position that is rotationally fixed about said generally upright axis with respect to the head, to move the brake activator between three vertically spaced positions, of which the lowermost is (i) a braking position in which the brake activator activates said brake, and the other two positions are (ii) a neutral position in which said brake is inactive and said body is not prevented from swivelling about an axis and (iii) a direction-lock position in which the body may be swivelled to one of plural selectable orientations with respect to the head at each of which the body is locked against said swivelling but the brake is inactive and the pedal remains in said rotationally fixed and accessible position at the castor assembly with respect to the head; and
a slidable coupling member that is irrotational with respect to said head by being keyed thereto, and is responsive to said brake activator to slidably move between three positions, respectively corresponding to said lowermost braking position, said neutral position and said direction-lock position, in which the slidable coupling member respectively actuates said brake, is keyed to said head without actuating the brake or preventing swivelling of the body and irrotationally couples said body to said head at one of said plural selectable orientations while the pedal remains in said rotationally fixed and accessible position at the castor assembly with respect to the head, wherein said brake has an indirect brake arrangement that includes a plunger depressed by said slidable coupling member, a rocker in turn pivoted by the plunger when depressed, a train of teeth on the wheel, and a brake element, wherein said brake element is biased out of engagement with the train of teeth but is driven by said pivoted rocker into engagement with the train of teeth whereby to prevent rotation of the wheel.

2. A swivel castor assembly according to claim 1 wherein in said braking position the body is prevented from swivelling about said axis.

3. A swivel castor assembly according to claim 1 wherein the brake activator is mounted to the head for pivotal movement between its respective positions about a generally horizontal axis.

4. A swivel castor assembly according to claim 3 wherein movement to the braking position is by foot depression of the brake activator, and movement to the direction-lock position is by lifting of the brake activator.

5. A swivel castor assembly according to claim 1 wherein said means for mounting the body such that it is able to swivel about a generally upright axis includes a cavity to receive a pintle, which cavity defines the upright axis.

6. A swivel castor assembly according to claim 5 further including a pintle received in said cavity for mounting the assembly to an overlying trolley or other apparatus so that the pintle does not rotate with respect to the trolley.

7. A swivel castor assembly according to claim 1 wherein said keying of the slidable coupling member to the head arises from engagement between complementary formations on said coupling member and on said head.

8. A swivel castor assembly according to claim 1 wherein said coupling of the body to the head includes engagement between cooperating formations that define interengageable plural orientations corresponding to said plural selectable orientations of the body.

9. A swivel castor assembly according to claim 8 wherein said cooperating formations are square male and female formations.

10. A swivel castor assembly according to claim 8 wherein said complementary formations allow plural selectable rotational locations of said coupling member that in turn define plural selectable sets of orientations of the cooperating formations and thereby of said body.

11. A swivel castor assembly according to claim 1 wherein the brake activator is generally u-shaped and embraces the head, and has a foot engageable web on a projecting portion.

12. A swivel castor assembly according to claim 1 including a pair of said rotatable wheels, one to either side of the body.

13. A swivel castor assembly according to claim 1 further including means to index said braking, neutral and direction-lock positions of the brake activator.

14. A swivel castor assembly according to claim 1 wherein said slidable coupling member is a slidable annular member.

15. A swivel castor assembly according to claim 1 further including a device mounted to said head for electronically effecting said movement of said brake activator between said braking, neutral and direction-lock positions.

16. A swivel castor assembly, including:
a body having at least one rotatable wheel engageable with a floor or ground surface below the body, a brake actuable to brake or prevent rotation of said wheel, and means for mounting the body such that it is able to swivel about a generally upright axis;
a head adapted to be mounted to an item to be supported by the castor assembly, so as to prevent or restrict rotation of the head about said upright axis relative to said item;
a brake activator including a pedal accessible for foot engagement, wherein the brake activator is mounted to the head and movable between positions including a braking position in which the brake activator activates said brake, a neutral position in which said brake is inactive and said body is not prevented from swivelling about said axis, and a direction-lock position in which the body may be swivelled to one of plural selectable orientations with respect to the head at each of which the body is locked against said swivelling but the brake is inactive; and
wherein said brake is an indirect brake arrangement that includes a plunger depressed by said slidable coupling member, a rocker in turn pivoted by the plunger when depressed, a train of teeth on the wheel, and a brake element that is biased out of engagement with the train of teeth but is driven by said pivoted rocker into engagement with the train of teeth whereby to prevent rotation of the wheel; and
wherein the assembly further includes a device mounted to said head that electronically effects said movement of said brake activator between said braking, neutral and direction-lock positions.

17. A swivel castor assembly according to claim 16 wherein in said braking position the body is prevented from swivelling about said axis.

18. A swivel castor assembly according to claim 17 wherein the brake activator projects from the body and/or head.

19. A swivel castor assembly according to claim 18 wherein the brake activator is foot-engageable.

20. A swivel castor assembly according to claim 19 wherein the brake activator is mounted to the head for pivotal movement between its respective positions about a generally horizontal axis.

21. A swivel castor assembly according to claim 19 wherein movement to the braking position is by foot depression of the brake activator, and movement to the direction-lock position is by lifting of the brake activator.

22. A swivel castor assembly according to claim 16 wherein said means for mounting the body such that it is able to swivel about a generally upright axis includes a cavity to receive a pintle, which cavity defines the upright axis.

23. A swivel castor assembly according to claim 22 further including a pintle received in said cavity for mounting the assembly to an overlying trolley or other apparatus so that the pintle does not rotate with respect to the trolley.

24. A swivel castor assembly according to claim 16 further including a slidable coupling member responsive to said brake activator to slidably move between three positions, respectively corresponding to said braking position, said neutral position and said direction-lock position, in which the slidable coupling member respectively actuates said brake, is keyed to said head without actuating the brake or preventing swivelling of the body, and irrotationally couples said body to said head at one of said plural selectable orientations.

25. A swivel castor assembly according to claim 24 wherein said keying of the slidable coupling member to the head arises from engagement between complementary formations on said coupling member and on said head.

26. A swivel castor assembly according to claim 24 wherein said coupling of the body to the head includes engagement between cooperating formations that define plural interengageable orientations corresponding to said plural selectable orientations of the body.

27. A swivel castor assembly according to claim 26 wherein said cooperating formations are square male and female formations.

28. A swivel castor assembly according to claim 26 wherein said complementary formations allow plural selectable rotational locations of said coupling member that in turn define plural selectable sets of orientations of the cooperating formations and thereby of said body.

29. A swivel castor assembly according to claim 24 wherein said slidable coupling member is a slidable annular member.

30. A swivel castor assembly according to claim 16 wherein the brake activator is generally u-shaped and embraces the head, and has a foot engageable web on a projecting portion.

31. A swivel castor assembly according to claim 16 including a pair of said rotatable wheels, one to either side of the body.

32. A swivel castor assembly according to claim 16 further including means to index said braking, neutral and direction-lock positions of the brake activator.

33. A swivel castor assembly according to claim 20 wherein movement to the braking position is by foot depression of the brake activator, and movement to the direction-lock position is by lifting of the brake activator.

34. A swivel castor assembly according to claim 1 wherein the brake is contained within the castor assembly.

35. A swivel castor assembly according to claim 16 wherein the brake is contained within the castor assembly.

36. A swivel castor assembly according to claim 16 wherein the break actuator includes a pedal accessible for foot engagement.

37. A swivel castor assembly according to claim 36 wherein the pedal is accessible for foot engagement at the castor assembly.

38. A swivel castor assembly according to claim 36 wherein the pedal is accessible for foot engagement at the castor assembly at a position that is rotationally fixed with respect to the head.

* * * * *